(12) United States Patent
Thelen et al.

(10) Patent No.: US 7,726,725 B2
(45) Date of Patent: Jun. 1, 2010

(54) VACUUM-FORMED "FIRM-FEEL" REINFORCEMENT FOR BUMPER FASCIAS

(75) Inventors: John L. Thelen, Lake Orion, MI (US); Steven R. Roddy, Harrison Township, MI (US)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 11/891,117

(22) Filed: Aug. 9, 2007

(65) Prior Publication Data
US 2009/0039676 A1  Feb. 12, 2009

(51) Int. Cl.
*B60R 19/44* (2006.01)
(52) U.S. Cl. .......................... 296/187.01; 296/187.09; 293/102; 293/120
(58) Field of Classification Search ............ 296/187.01, 296/187.03, 187.09, 193.09–193.11; 293/142, 293/117, 115, 102, 120, 122
See application file for complete search history.

(56) References Cited

U.S. PATENT DOCUMENTS

| | | | | |
|---|---|---|---|---|
| 3,940,176 A * | 2/1976 | Ito et al. | ................ | 296/187.09 |
| 4,402,545 A * | 9/1983 | Utsunomiya et al. | ........ | 296/204 |
| 5,092,643 A * | 3/1992 | Okamoto et al. | ............ | 293/155 |
| 5,918,663 A * | 7/1999 | Hoglinger et al. | ............. | 165/41 |
| 5,922,926 A * | 7/1999 | Back et al. | ................... | 588/304 |
| 6,245,415 B1 * | 6/2001 | Keller et al. | ................. | 428/188 |
| 6,306,964 B1 * | 10/2001 | Evans et al. | .................... | 525/74 |
| 6,511,109 B1 * | 1/2003 | Schultz et al. | ............. | 293/120 |
| 6,793,276 B2 * | 9/2004 | Sugihara et al. | ............. | 296/204 |
| 6,846,038 B1 * | 1/2005 | White et al. | .......... | 296/193.11 |
| 7,052,075 B2 * | 5/2006 | Kamada et al. | ........ | 296/187.01 |
| 7,195,306 B2 * | 3/2007 | Egawa et al. | ........... | 296/187.08 |
| 2009/0152882 A1 * | 6/2009 | Kim | .......................... | 293/117 |
| 2009/0267364 A1 * | 10/2009 | Crainic et al. | ............... | 293/117 |

FOREIGN PATENT DOCUMENTS

| | | |
|---|---|---|
| EP | 0 150 636 | 8/1985 |
| EP | 1 172 260 A2 | 1/2002 |
| FR | 2 903 358 | 1/2008 |
| JP | 01 022653 | 1/1989 |
| WO | WO 01/92064 | 12/2001 |
| WO | WO 2006/008137 | 1/2006 |

\* cited by examiner

*Primary Examiner*—Glenn Dayoan
*Assistant Examiner*—Gregory Blankenship
(74) *Attorney, Agent, or Firm*—Warn Partners, P.C.; Marc Luddy

(57) ABSTRACT

The present invention relates to a mechanism for reinforcing a fascia including at least one reinforcement structure and at least one strengthening feature. The reinforcement structure is attached to the fascia so that at least a portion of the fascia is covered by the reinforcement structure. The strengthening feature is on at least one side of the reinforcement structure.

15 Claims, 2 Drawing Sheets

VACUUM-FORMED "FIRM-FEEL" REINFORCEMENT FOR BUMPER FASCIAS

FIELD OF THE INVENTION

The present invention relates to a mechanism for reinforcing the structural integrity of a fascia.

BACKGROUND OF THE INVENTION

Typically motorized vehicles have a fascia which extends along the front end and/or the rear end in order to absorb energy from front and/or rear end impacts. Furthermore, the fascias are designed to improve the aesthetics of the vehicle by covering up components of the vehicle with an exterior surface that complies with the class A standards set by car manufacturers for OEMs. When the fascia is mounted to the vehicle, it extends along the front end and/or rear end and is curved towards the wheel base. The section between the front end and/or rear end in the wheel base is known as a wing, and a wing typically has a reduced structural integrity due to the shape of the wing. This area of the fascia is also referred to as a featureless area due to the wing having less structural integrity then other portions of the fascia.

Car manufacturers have a standard known as the "firm feel guidelines" in which a vehicle component must have adequate structural integrity to support a force applied by a person. Due to the size and shape of the wing portion of the fascia, the wing must be reinforced in order to satisfy the firm feel guidelines. However, it is time consuming and costly to increase the structural integrity of the wing. The thickness of the wing can be increased in order to add structural integrity to the wing, however, to do this the injection molding or forming tooling must be altered to accommodate the increased size of the wing. Thus, the retooling for this improvement adds to the time and cost of manufacturing the fascia. Increasing the thickness of the fascia wing using the same material used to produce other portions of the fascia, can be costly due to the material cost typically used to manufacture the fascia.

One alternate design involves using a second material placed behind the fascia which is less expensive while adding the necessary structural integrity. However, due to the location of the wing, it is difficult to place materials between the fascia wing and the vehicle. For example, an expandable foam can be injected between the fascia wing and the vehicle in order to increase the thickness of the wing. However, it is difficult and time consuming to inject the foam in the confined area between the fascia wing and the vehicle.

Therefore, it is desirable to develop a mechanism for reinforcing the fascia wing in which a secondary component is placed on the interior side of the fascia.

SUMMARY OF THE INVENTION

The present invention relates to a mechanism for reinforcing a fascia including at least one reinforcement structure and at least one strengthening feature. The reinforcement structure is attached to the fascia so that at least a portion of the fascia is covered by the reinforcement structure. The strengthening feature is on at least one side of the reinforcement structure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
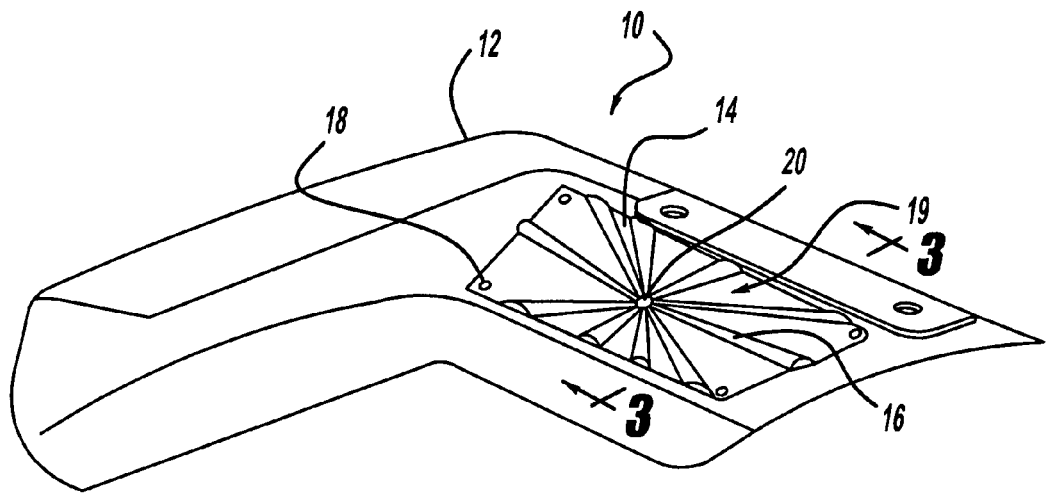
FIG. 1 is a perspective view of a structure for reinforcing a fascia in accordance with an embodiment of the present invention.
Figure 2:
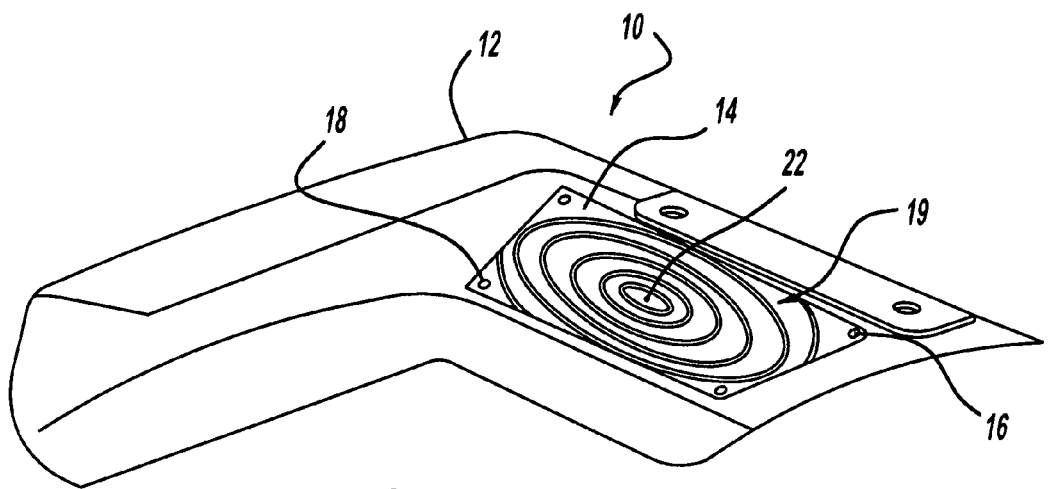
FIG. 2 is a perspective view of a structure for reinforcing a fascia in accordance with an embodiment of the present invention.

In reference to FIGS. 1 and 2, a structure for reinforcing a fascia is generally shown at 10. A fascia 12 has at least one reinforcement structure 14 that is attached to the fascia 12 in order to reinforce or increase the energy absorption characteristics of the fascia 12. The reinforcement structure 14 is a vacuum formed material that has at least one strengthening feature 16 that extends along the reinforcement structure 14. Thus, the strengthening feature 16 creates the reinforcing characteristics of the reinforcement structure 14 which ultimately increase the energy absorption characteristics of the fascia 12.

The reinforcement structure 14 is connected to the fascia 12 by an attachment mechanism 18. The attachment mechanism 18 used, by way of example but not limitation, is tape attachment, sonic weld, clips, fasteners, adhesives, or heat stake. The fascia 12 can be pre-manufactured, such that the reinforcement structure 14 is connected to the fascia 12 by the attachment mechanism 18 in a secondary manufacturing step after the fascia 12 is formed. By implementing a secondary manufacturing step, the tooling costs of producing the fascia 12 are reduced due to the injection molding or forming tool used to produce the fascia 12 being simplified by not requiring the tool to have the features needed to create the reinforcement structure 14 at the time the fascia 12 is produced.

A plurality of strengthening features 16 are provided. Strengthening features 16 extend along the reinforcement structure 14 but do not all extend in the same direction along the reinforcement structure 14. The reason for this is that when all of the strengthening features 16 extend in the same direction, the reinforcement structure 14 can bend or fold along a contour line 19 that extends along the entire length of the reinforcement structure 14 in between strengthening features 16.

Figure 3:
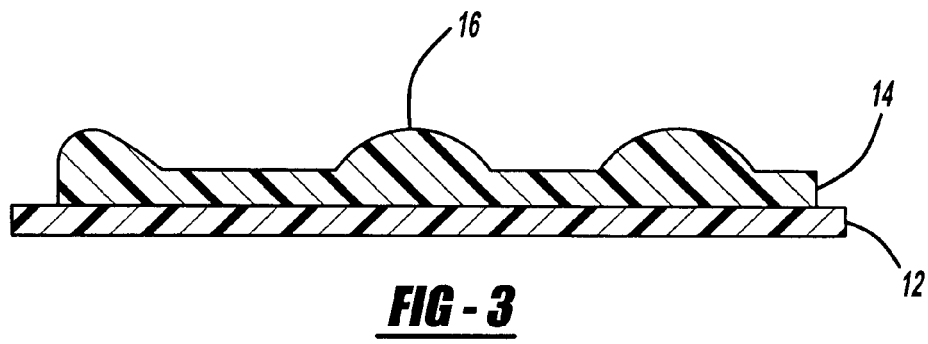
FIG. 3 is a cross-sectional view across the line 3-3 in FIG. 1.

Referring to FIG. 3, typically the strengthening features 16 are areas of the reinforcement structure 14 that have an increased thickness when compared to the remaining areas of the reinforcement structure 14. Thus, the strengthening features 16 are made out of the same material as the remaining portions of the reinforcement structure 14. However, a second material can be used to form the strengthening feature 16, such that the second material is formed with the material used to make the reinforcement structure 14.

By way of explanation and not limitation, the reinforcement structure 14 can be made of a polypropylene material or an acryolnitryl styrene acrylic copolymer (ASA) or equivalents, modifications, blends, or copolymers thereof. The above materials are preferred due to their weight to strength ratio and their forming characteristics. Thus, the above materials have strength characteristics that support a greater amount of force than their weight, so that the additional weight added to the vehicle when the reinforcement structure 14 is mounted to the fascia 12 is minimized yet a highly durable reinforcement structure 14 is being used. Further, the above materials can be molded or formed in order to fit the desired shape of the fascia 12. In addition, the cost of producing the tooling to form the above materials is more economical than the tooling cost to develop an injection molder to include a reinforcement structure 14 with the fascia 12. The preferred material is generally a more economic material when compared to costs of other materials, such as the typical material used on the remaining portions of the fascia 12. Finally, by using the above materials the reinforcement structure 14 can be manufactured and attached to the fascia 12 in a relatively short period of time due to the ease of forming and shaping the above materials.

Referring to FIG. 1, by way of explanation and not limitation, one embodiment of a pattern for the strengthening feature 16 is set forth wherein the strengthening features 16 has a focal point 20 in approximately the center of the reinforcement structure 14, and the strengthening features 16 radially extend from the focal point 20. Thus, the strengthening features 16 are extending in a variety of directions along the reinforcement structure 14, so that the contour line 19 between strengthening features 16 does not extend across the entire reinforcement structure 14.

Figure 4:
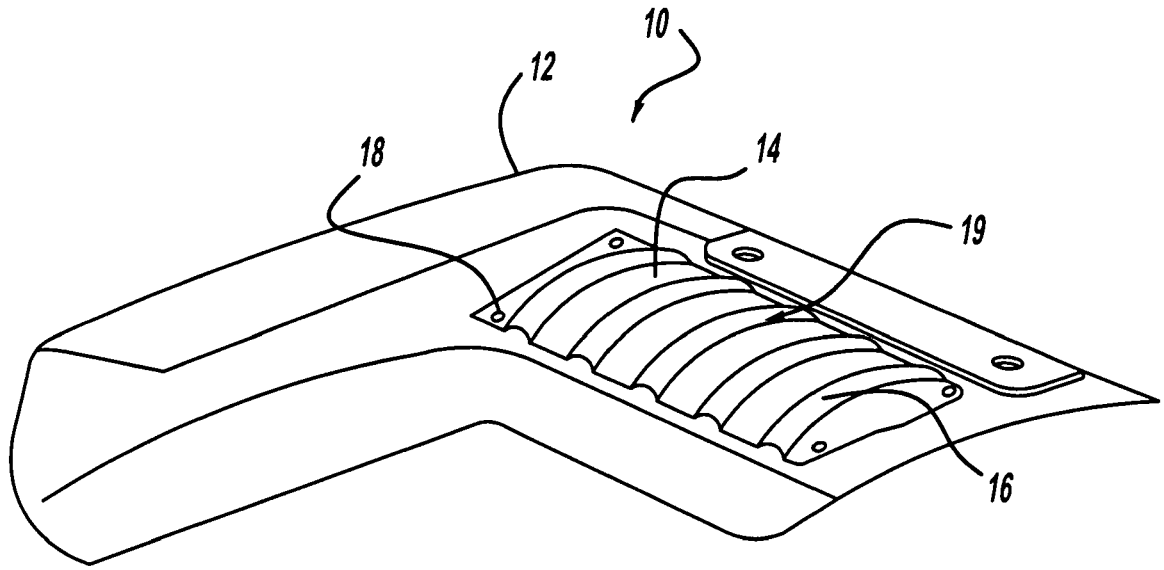
FIG. 4 is a perspective view of a structure for reinforcing a fascia in accordance with an embodiment of the present invention.
Figure 5:
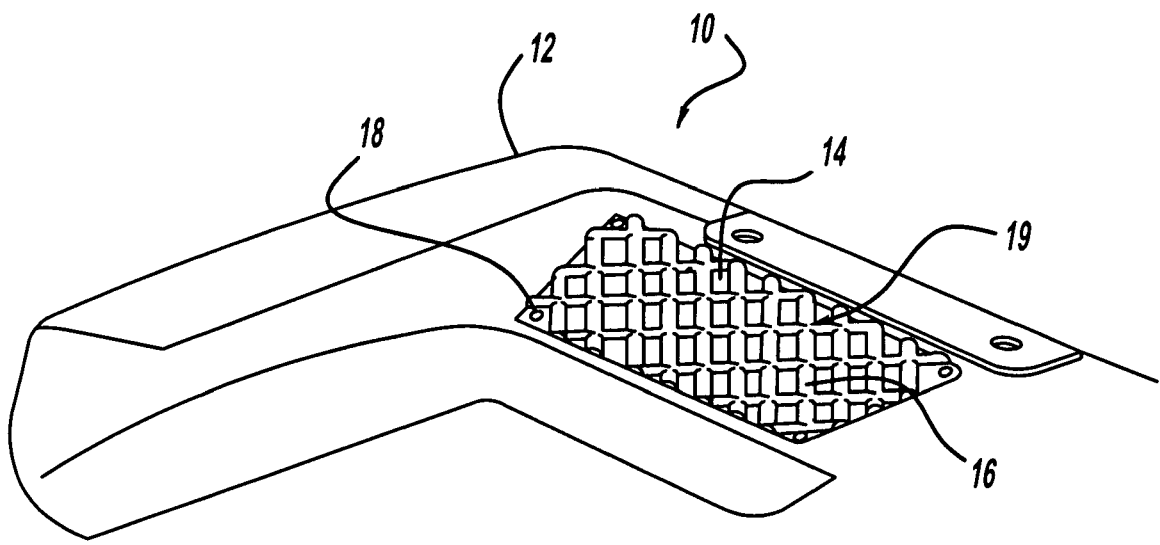
FIG. 5 is a perspective view of a structure for reinforcing a fascia in accordance with an embodiment of the present invention.

Referring to FIG. 2, another example of a pattern for the strengthening features 16 is set forth wherein a center point 22 can be placed in the center of the reinforcement structure 14, and the strengthening feature 16 circumferentially extends around the center point 22. Thus, as the distance between the strengthening feature 16 and the center point 22 increases, the diameter of the strengthening feature 16 is increased. Again, this prevents the contour line 19 from extending across the entire length of the reinforcement structure 14 between strengthening features 16. It should be appreciated that it is within the scope of the present invention, that the reinforcement structure 14 has the strengthening features 16 such as by way of illustration but not limitation, features that extend horizontally, vertically, diagonally, in a semi-circular manner (FIG. 4) or in a criss crossing manner (FIG. 5), or any combination thereof across the length of the reinforcement structure 16.

The reinforcement structure 14 is attached to the fascia 12 at a featureless area of the fascia 12. A featureless area of the fascia 12 is a portion of the fascia 12 that has less structural integrity than the remaining portions of the fascia 12. For example, a typical fascia is mounted to the front end or rear end of a vehicle (not shown) and extends from the front end or the rear end towards a wheel base (not shown). The portion of the fascia 14 that extends from the front end or rear end towards the wheel base is typically known as a wing and is a featureless area. Thus, due to the lack of structural integrity of the featureless area, the featureless area does not satisfy the "firm feel guidelines" of an OEM. Therefore, the reinforcement structure 14 is attached to the fascia 12 on the interior side of the fascia 12 in order to increase the energy absorption characteristics of the fascia 12, so that the fascia 12 satisfy the "firm feel guidelines."

The reinforcement structure 14 can be attached to the interior side of the fascia 12 so that the reinforcement structure 14 does not interfere or damage the exterior surface of the fascia 12 which most likely complies with the class "A" specifications for an exterior finish of a motorized vehicle. Further, any number of reinforcement structures 14 are attached to the fascia 12, depending on the number of featureless areas of the fascia in which the structural integrity needs to be enhanced. For example, the fascia 12 typically has two wings so that two reinforcement structures 14 will be attached to the two wings in order to enhance the energy absorbing characteristics of the fascia 12. Thus, any number of reinforcement structures 14 are attached to any number of featureless areas of the fascia 12, in order for the fascia 12 to have enhanced energy absorption characteristics such that the fascia 12 satisfies the "firm feel guidelines" and the reinforcement structure 14 maintains the shape of the fascia 12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A structure for reinforcing a fascia comprising:
   a fascia having a featureless area;
   at least one reinforcement structure that is vacuum formed, wherein said at least one reinforcement structure is attached to said featureless area of said fascia, wherein at least a portion of said fascia is covered by said at least one reinforcement structure;
   a plurality of strengthening features on said at least one reinforcement structure, wherein said plurality of strengthening features increase the strength of said at least one reinforcement structure; and
   an attachment mechanism, wherein said attachment mechanism is used to attach said at least one reinforcement structure to said fascia in a secondary manufacturing step after said fascia is formed, wherein said plurality of strengthening features have a center point in the center of said at least one reinforcement structure, and said plurality of strengthening features circumferentially extend around said center point by increasing the radius of said plurality of strengthening features as the distance from said center point is increased.

2. The mechanism for reinforcing a fascia of claim 1, wherein said attachment mechanism attaches said reinforcement structure to said fascia by tape, clips, fasteners, adhesives, sonic weld, and heat stake.

3. The structure for reinforcing a fascia of claim 1, wherein said attachment mechanism attaches said reinforcement structure to said fascia by tape, clips, fasteners, adhesives, sonic weld, and heat stake.

4. The structure for reinforcing a fascia of claim 1, wherein said at least one reinforcement structure is attached to an interior side of said fascia.

5. The structure for reinforcing a fascia of claim 1, wherein a material of said reinforcement structure comprises a polypropylene or acryolnitryl styrene acrylic copolymer and copolymer blends and mixtures thereof.

6. A structure for reinforcing a fascia comprising:
   a fascia having a featureless area;
   at least one reinforcement structure that is vacuum formed, wherein said at least one reinforcement structure is attached to said featureless area of said fascia, wherein at least a portion of said fascia is covered by said at least one reinforcement structure;

a plurality of strengthening features on said at least one reinforcement structure, wherein said plurality of strengthening features increase the strength of said at least one reinforcement structure; and an attachment mechanism, wherein said attachment mechanism is used to attach said at least one reinforcement structure to said fascia in a secondary manufacturing step after said fascia is formed, wherein said strengthening features are in the shape of semi-circles.

7. The mechanism for reinforcing a fascia of claim 6, wherein said attachment mechanism attaches said reinforcement structure to said fascia by tape, clips, fasteners, adhesives, sonic weld, and heat stake.

8. The structure for reinforcing a fascia of claim 6, wherein said attachment mechanism attaches said reinforcement structure to said fascia by tape, clips, fasteners, adhesives, sonic weld, and heat stake.

9. The structure for reinforcing a fascia of claim 6, wherein said at least one reinforcement structure is attached to an interior side of said fascia.

10. The structure for reinforcing a fascia of claim 6, wherein a material of said reinforcement structure comprises a polypropylene or acryolnitryl styrene acrylic copolymer and copolymer blends and mixtures thereof.

11. A mechanism for reinforcing a fascia comprising:
a fascia;
a plurality of reinforcement structures that are vacuum formed, wherein said plurality of reinforcement structures are attached to an interior side of a featureless area of said fascia where said fascia has less structural integrity than remaining portions of said fascia, so that at least a portion of said fascia is covered by said reinforcement structure;
a plurality of strengthening features on said plurality of reinforcement structures, wherein said plurality of strengthening features increase the strength of said plurality of reinforcement structures, so that an energy absorption characteristic of said fascia is increased when said reinforcement structure is attached to said fascia so that said fascia has a firm feel and said plurality of reinforcement structures maintain the shape of said fascia, wherein said plurality of strengthening features have a center point in the center of said reinforcement structure, and said plurality of strengthening features circumferentially extend around said center point by increasing the radius of said plurality of strengthening features as the distance from said center point is increased; and
an attachment mechanism is used to attached said reinforcement structure to said fascia, so that said plurality of reinforcement structures are attached to said fascia in a secondary manufacturing step after said fascia is formed, wherein said attachment mechanism is at least one of a tape securing said plurality of reinforcement structures to said fascia, mechanical attachment, sonic welding, bonded, and heat staked.

12. The structure for reinforcing a fascia of claim 11, wherein said at least one reinforcement structure is attached to said fascia in order to increase the energy absorption characteristics of said fascia.

13. The structure for reinforcing a fascia of claim 11, wherein said at least one reinforcement structure is attached to an interior side of said fascia.

14. The structure for reinforcing a fascia of claim 11, wherein said at least one reinforcement structure is attached to a featureless area of said fascia.

15. The structure for reinforcing a fascia of claim 11, wherein a material of said reinforcement structure comprises a polypropylene or acryolnitryl styrene acrylic copolymer and copolymer blends and mixtures thereof.

\* \* \* \* \*

UNITED STATES PATENT AND TRADEMARK OFFICE
CERTIFICATE OF CORRECTION

PATENT NO. : 7,726,725 B2  Page 1 of 1
APPLICATION NO. : 11/891117
DATED : June 1, 2010
INVENTOR(S) : Thelen et al.

It is certified that error appears in the above-identified patent and that said Letters Patent is hereby corrected as shown below:

Column 5,
Line 12, Claim 7, "The mechanism" should be -- The structure --.

Column 6,
Line 13, Claim 11, "attached" should be -- attach --.

Signed and Sealed this

Fourteenth Day of September, 2010

David J. Kappos
*Director of the United States Patent and Trademark Office*